Figure 1:
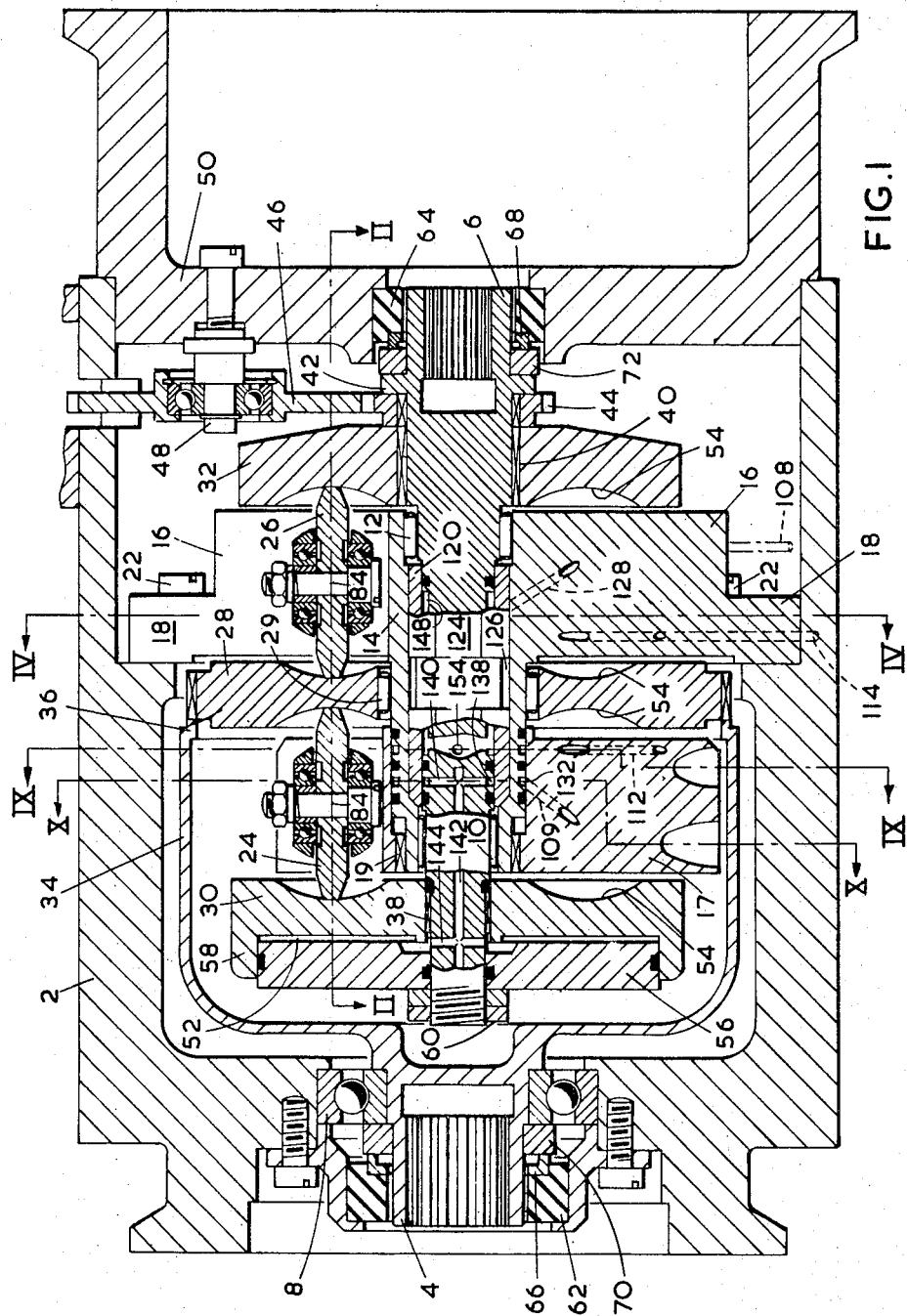

United States Patent [19]

Sharpe et al.

[11] 3,802,284
[45] Apr. 9, 1974

[54] VARIABLE-RATIO TORIC DRIVE WITH HYDRAULIC RELIEF MEANS

[75] Inventors: Raymond Sharpe, Mirfield; James Christopher Herbert Triffiti, Baildon, both of England

[73] Assignee: Rotax Limited, Birmingham, England

[22] Filed: Aug. 2, 1972

[21] Appl. No.: 277,253

[52] U.S. Cl. ................................................. 74/200
[51] Int. Cl. ............................................ F16h 15/38
[58] Field of Search ......... 74/190, 200, 208; 91/402

[56] References Cited
UNITED STATES PATENTS
3,413,864  12/1968  Magill et al. ........................... 74/200
3,345,882  10/1967  Armstrong .............................. 74/200
3,276,279  10/1966  De Brie Perry et al. ............... 74/200

Primary Examiner—Benjamin W. Wyche
Assistant Examiner—Allan Russell Burke
Attorney, Agent, or Firm—Holman & Stern

[57] ABSTRACT

A variable-ratio frictional drive gear comprises at least two axially spaced torus discs between which there is a set of circumferentially spaced drive rollers in frictional rolling contact with toroidal surfaces on the discs. Each roller is rotatably mounted in a tangentially controlled roller carriage having end portions lying on a roller tilt axis at right angles to the axis of rotation of the roller. The end portions of each roller carriage are slidably and rotatably supported by a support member whereby the roller carriages can be moved tangentially in order to control indirectly the ratio angle of the roller. There is further provided a piston which is slidable in the cylinder and which is connected to one end portion of a carriage of at least one roller to thereby, in use, effect tangential movement of the roller carriage. Means are also provided to reduce fluid pressure which, in use, is applied to the piston, such reduction occurring when the piston reaches a predetermined axial position.

5 Claims, 12 Drawing Figures

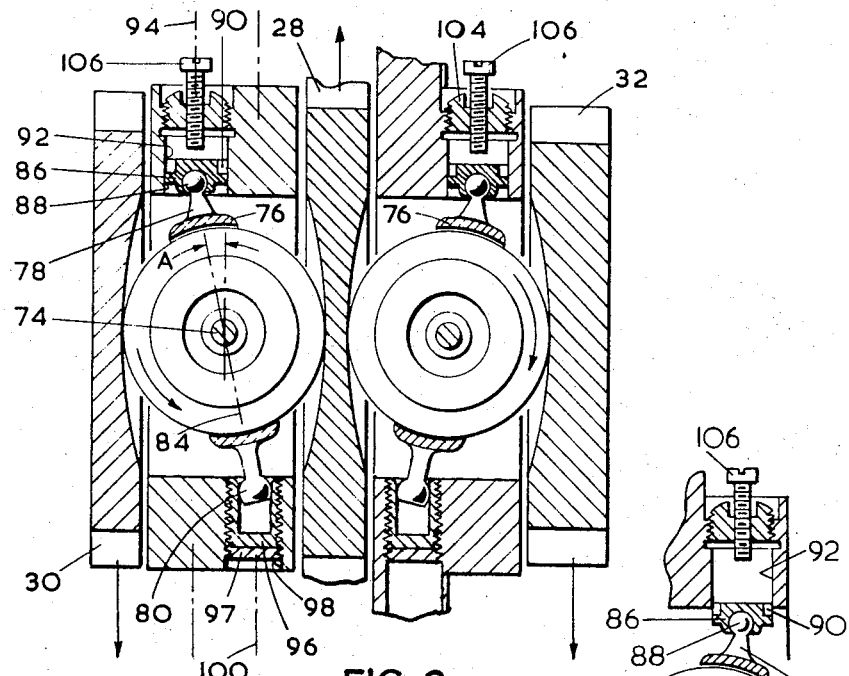
FIG. 2
FIG. 3
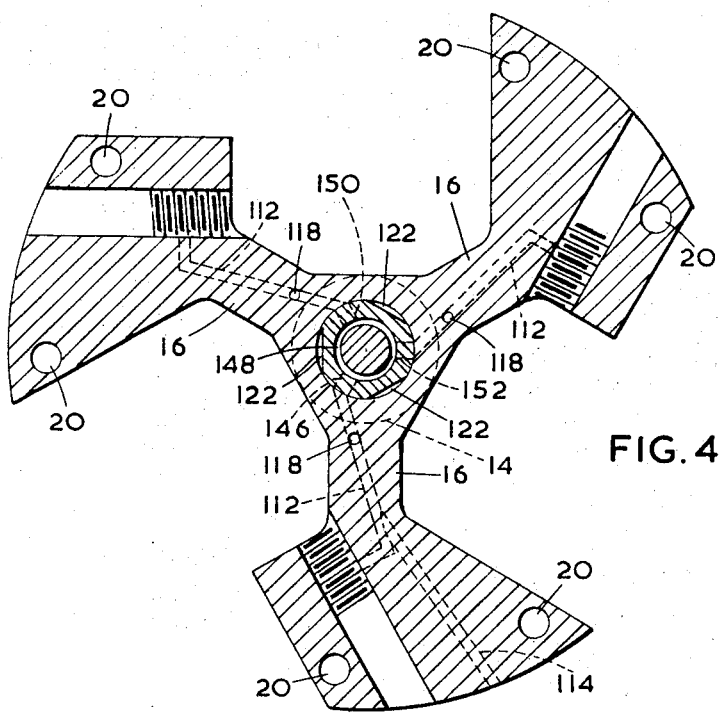
FIG. 4

{ 3,802,284 }

VARIABLE-RATIO TORIC DRIVE WITH HYDRAULIC RELIEF MEANS

This invention relates to variable-ratio frictional drive gears of the kind comprising at least two axially spaced torus discs between which there is a set of circumferentially spaced drive rollers in frictional rolling contact with toroidal surfaces on the discs, each roller being rotatably mounted in a roller carriage which is capable of tilting about an axis at right angles to the axis of rotation of the roller so as to vary the distances from the gear axis at which the roller engages respectively the two discs, thus varying the drive ratio of the gear. The angle of tilt of the roller carriages, as it controls the drive ratio of the gear, is called, "ratio angle."

One way of altering the ratio angle is to tilt the roller carriages by means of a positive mechanical linkage. This invention, is, however, concerned with an alternative arrangement which achieves this control indirectly by bodily moving the roller carriages tangentially with respect to the gear axis, and by allowing the rollers then to steer themselves towards a different ratio angle.

In accordance with the present invention there is provided a gear comprising at least two axially spaced torus discs between which there is a set of circumferentially spaced drive rollers in frictional rolling contact with toroidal surfaces on the discs, each roller being rotatably mounted in a tangentially controlled roller carriage having end portions lying on a roller tilt axis at right angles to the axis of rotation of the roller, the end portions of each roller carriage being slidably and rotatably supported by a support member whereby the roller carriages can be moved tangentially in order to control indirectly the ratio angle of the rollers, there being further provided piston means which is slidable in a cylinder and which is connected to one end portion of a carriage of at least one roller to thereby, in use, effect tangential movement of the roller carriage, means being also provided to reduce fluid pressure which, in use, is applied to said piston means such reduction occurring when the piston reaches a predetermined axial position.

Preferably, said means comprises at least one relief or recess formed in said piston means such that, in use, after said piston means reaches said predetermined axial position said relief or recess will permit hydraulic fluid to pass out of said cylinder via said relief or recess.

Figures 5, 6:
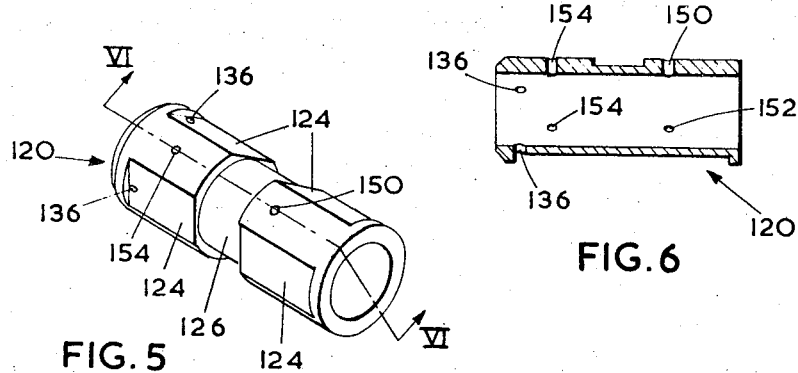
Figure 7:
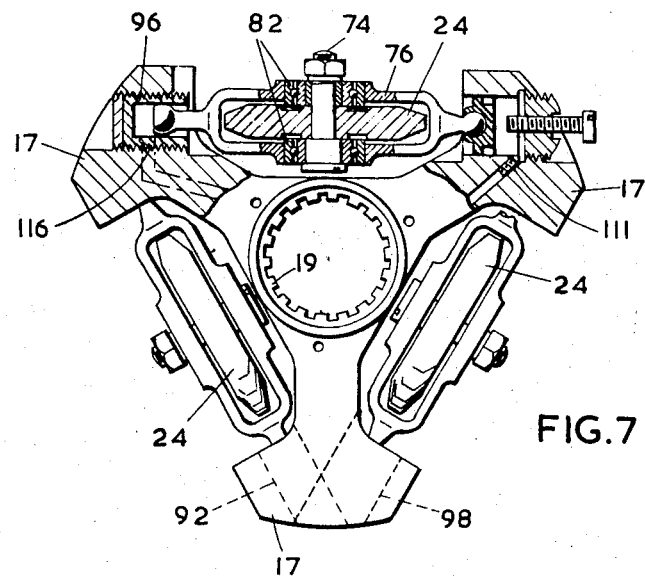
Figure 8:
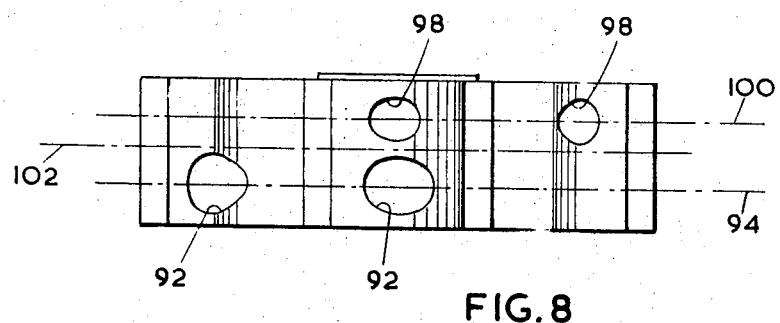
Figure 9:
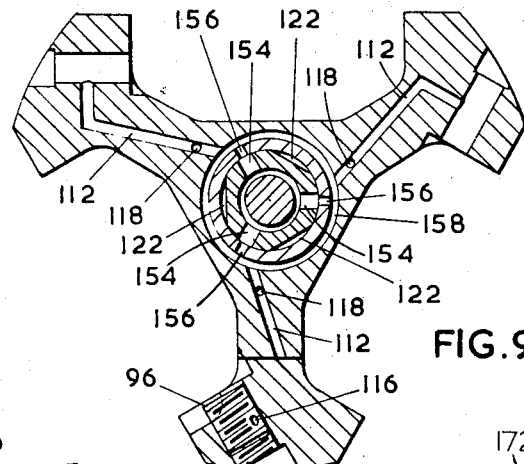
Figure 10:
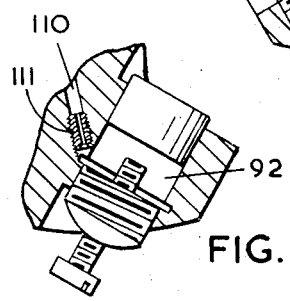
Figure 12:
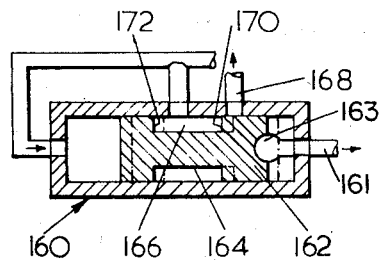
Figure 11:
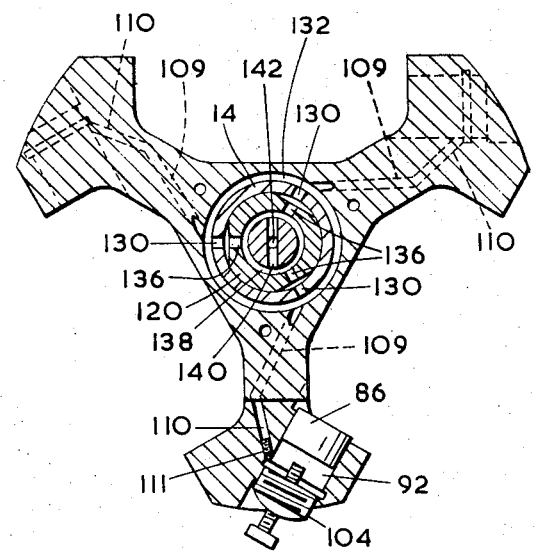

The invention will now be more particularly described with reference to the accompanying drawings wherein FIG. 1 is a longitudinal sectional view of one embodiment of a variable ratio frictional drive gear according to the present invention, FIG. 2 is a fragmentary sectional view taken along the line II—II in FIG. 1, FIG. 3 is an enlarged sectional view illustrating one of the pistons of FIG. 2 in a position in which hydraulic fluid can pass out of the pressure cylinder associated with that piston, FIG. 4 is a sectional view of the main spider member taken along the lines IV—IV of FIG. 1, FIG. 5 is a perspective view of a sleeve which defines oil flow passages, FIG. 6 is a longitudinal sectional view of the sleeve taken along the lines VI—VI of FIG. 5, FIG. 7 is a partially sectioned end view of the secondary spider member showing the rollers in position, FIG. 8 is a side view of the spider member shown in FIG. 7 taken from below FIG. 7 but without the rollers, FIG. 9 is a sectional view of the spider member shown in FIG. 7, taken along the line IX—IX of FIG. 1, FIG. 10 is a section similar to FIG. 9 but taken along the line X—X in FIG. 1, FIG. 11 is an enlarged detail of the bottom part of FIG. 10, and FIG. 12 is a sectional view illustrating part of an alternative embodiment of a variable-ratio frictional drive gear according to the present invention.

Referring now more particularly to FIGS. 1 to 11 of the accompanying drawings, the variable-ratio frictional drive gear shown therein has a casing 2 with an input shaft 4 and an output shaft 6. The input shaft 4 is mounted in a ball bearing 8 at the left hand end of the casing (as shown in FIG. 1), while the output shaft 6 is mounted in two needle roller bearings 10 and 12 in an integral sleeve-like hub portion 14 of a first support member in the form of a main spider member (shown particularly in FIG. 4) having three radial arms 16. Each of the arms 16 has a flange end portion 18 with two holes 20 for bolts 22 by which the main spider member is secured in the casing 2 of the gear.

There are two sets of driving rollers, each set having three rollers 24 and 26 respectively. The rollers 24 are in driving engagement between a middle torus disc 28 and an end torus disc 30, while the rollers 26 are in driving engagement between the middle torus disc 28 and an end torus disc 32. The middle torus disc 28 is driven by the input shaft 4 via a drum 34 which has dog teeth 37 engaging in axial recesses around the disc 28 so as to permit relative axial movement between the disc 28 and the drum 34. The end discs 30 and 32 have splines 38 and 40 engaging the output shaft, while the middle torus disc 28 is mounted around a needle roller bearing 29.

The rollers 26 are carried by the arms 16 of the main spider member, while the rollers 24 are carried by arms 17 of a second support member in the form of a secondary spider member (see particularly FIG. 7) which is generally similar to the main spider member except for the absence of the mounting flange portions 18. Instead the secondary spider member is mounted on the end of the hub sleeve 14 of the main spider member with an axial spline 19 which restrains the secondary spider member against rotation while allowing axial movement.

Between the end disc 32 and a flange 42 on the output shaft there is a gear wheel 44 which drives an idler gear wheel 46 mounted on a spindle 48 secured to an end casing member 50. The idler gear 46 drives a further gear wheel (not shown) lying outside the casing 2 and coupled to a shaft which drives both a pump and a governor.

The end disc 32 will not, in use, move with respect to the output shaft 6 since it is firmly pressed against the gear 44, which in turn is backed by the flange 42 on the output shaft. On the other hand, the end disc 30 is axially movable with respect to the output shaft and is urged to the right (as viewed in FIG. 1) during use by hydraulic pressure in a chamber 52 so as to provide a necessary driving reaction between the rollers and the toroidal surfaces 54 of the torus disc. The chamber 52 is defined by the disc 30 and by a fixed circular plate 56 which serves in effect as a piston within a cylindrical space defined by a flange 58 on the disc 30. Locknuts 60 on the left hand end of the shaft 6 retain the circular plate 56 on the output shaft.

Seals 62 and 64 prevent the escape of oil through leakage passages between the input and output shafts and the surrounding casing parts. These seals include rings 66 and 68 which are pressed firmly against wear pads 70 and 72 the rings being stationary while the wear pads rotate with the shafts.

Each roller is mounted by means of a bolt 74 in a roller carriage comprising a yoke 76 with end portions 78 and 80. The bolt 74 in each case serves as a spindle which rotates in bearings 82 mounted in the yoke 76.

As shown in FIG. 2, the end portions 78 and 80 of each roller carriage lie on a tilt axis 84 about which the roller carriage can tilt to change the distances from the gear axis at which the roller engages its two co-operating torus discs. The rollers are shown in FIG. 1 in the positions in which they transmit a 1:1 gear ratio. It will be understood that, in order to transmit a stepped-up gear ratio the rollers with their roller carriages would tilt about the axes 84 in order to engage the centre torus disc 28 at points close to the gear axis, and in order to transmit a stepped-down gear ratio the roller carriages would tilt in the opposite direction so as to bring the rollers into engagement with the centre torus disc 28 at a greater distance from the gear axis.

As shown in FIGS. 2 and 3, the end portion 78 of each roller carriage is universally connected to piston means in the form of a piston 86 which has a part spherical socket in which a ball end 88 on the roller carriage engages. The piston 86 is slidable in a pressure cylinder 92 arranged with its axis in a plane 94 normal to the gear axis. Each piston 86 is provided adjacent that axial end thereof remote from the associated end portion 78 with a plurality of recesses 90 which permit hydraulic fluid in the pressure cylinder 92 to escape via these recesses 90 when the piston 86 reaches a predetermined axial position for a purpose as will become apparent hereinafter.

The end portion 80 of each roller carriage is slidably mounted in a guide cylinder defined by a threaded sleeve 96 which is screwed into a bore 98 in another arm of the spider member, and is locked in position by a threaded plug 97. The guide cylinder defined by the sleeve 96 has its axis lying in a plane 100 which is also normal to the gear axis.

As shown particularly in FIG. 8, the pressure and guide cylinders lie entirely on opposite sides of an intermediate plane 102 lying between and parallel to the planes 94 and 100. In fact, in the case of the guide cylinder, not only the cylinder itself (i.e., the cylindrical wall guiding the guide end 80) but also the entire sleeve 96 lie to one side of the intermediate plane 102. Accordingly, the bore 98 and the pressure cylinder bore can be drilled right through each spider arm without intersecting; as shown in FIG. 7 these bores do overlap as viewed in a direction parallel to the gear axis. Moreover this arrangement results in a camber angle; that is to say an angle of inclination between each roller carriage tilt axis 84 and a plane normal to the gear axis. The camber angle is the angle A shown in FIG. 2 and it has been found that a camber angle gives rise to a desirable mode of damping which can virtually eliminate any tendency for ratio angle oscillation and this facilitates the design of a highly stable gear without the need for elaborate additional damping devices for achieving the necessary damping. Furthermore, the degree of camber angle provided together with the maximum available tangential movement of each roller carriage will dictate the maximum degree of tilt of the roller carriage.

The effect produced by the camber angle can best be explained with reference to FIG. 2 wherein the directions of movement of the torus discs are indicated by the arrows in FIG. 2. The transmission of torque by the rollers produces a torque reaction on the roller carriages urging the pistons 86 into the pressure cylinder 92. FIG. 3 shows the pistons when they are nearly at the extremes of their travel out of the cylinders 92. The limits of movement into the cylinders are determined by stop screws 106 in screw threaded plugs 104 which close the ends of the pressure cylinders. When midway between their extreme positions, the roller carriages produce a 1:1 drive ratio; each roller axis of rotation 74 at this stage intersects the gear axis and is precisely at right angles to the gear axis. If then the roller carriages are displaced tangentially by an increase pressure acting on the pistons, against the direction of the torque reaction, (i.e., downwards as viewed in FIG. 2), equilibrium is destroyed because the roller axes no longer intersect the gear axis. As a result steering forces are imposed on the rollers by the torus discs so as to tilt the roller carriages about their tilt axes 84 until equilibrium is again restored by virtue of the roller axes 74 again intersecting the gear axis, the degree of tilt (i.e., the amount of ratio angle change) being dependent on the amount of tangential displacement. Tangential displacement in the opposite direction (i.e., by reducing the pressure acting on the pistons 90) results in tilting of the rollers in the opposite direction.

Each pressure cylinder is fed with control oil delivered into the gear through a passageway 108 shown diagrammatically in FIG. 1. This oil is distributed from the centre of each spider member through passageways 109, 110 shown best in FIG. 10.

At the end of each passageway 110 adjacent to the pressure cylinder there is a screwed-in plug 111 which has a restricted orifice so as to damp any tendency which might arise for the pistons to oscillate in the pressure cylinders.

A further set of passageways 112 in each spider (shown in FIGS. 4 and 9) is fed with lubricating oil distributed also from the centre of the gear, the lubricating oil being supplied to the gear through a passageway 114 in the main spider member. As shown in FIG. 7, lubricating oil is fed to each guide cylinder through a lateral hole 116. Lubrication is provided for the rollers through axial holes 118 passing through the passageways 112 and extending right through the spider arm. Each hole 118 delivers a spray of oil at each end to the adjacent toroidal face 54 in an area near the inner periphery of a toroidal face.

The control oil and lubricating oil are separated at the centre of the gear by a fixed sleeve 120 shown particularly in FIGS. 5 and 6, the control oil being in three circumferentially spaced axially extending channels 122 defined by cut-away flat surfaces 124 on the outside of the sleeve 120. The three channels communicate with one another through a circumferential groove 126. Control oil from the passageway 108 enters a right hand end of one of the three channels 122 through an oblique passageway 128 shown in FIG. 1, and some oil also enters the passageway similar to the passageway 110 in the secondary spider member (FIG. 10), leading to one of the pressure cylinders. Similar passageways from the ends of the other channels 122 (i.e., similar to the passageways 109, 110 shown in FIG. 10) supply control oil to the pressure cylinders in the other arms of the main spider member. At the left hand end of the channels 122 there are three radial holes 130 (FIG. 10) which pass through the hub sleeve 14 of the main spider member and lead to a circumferential groove 132 in the hub sleeve which communicates with the oblique passageway sections 109 which lead via the sections 110 to the pressure cylinders in the arms of the secondary spider member.

In line with the radial holes 130 through the fixed hub sleeve 14 there are holes 136 passing through the sleeve 120 and communicating with a circumferential groove 138 in the output shaft 6. From this groove 138 control oil is drawn through a diametral bore 140 which communicates with an axial bore 142 which in turn communicates with the chamber 52 via a further diametral bore 144. Accordingly, control oil which is at the same pressure as the oil in the pressure cylinders, fills the chamber 52 and urges the torus disc 30 away from the fixed circular plate 56 to provide the necessary axial loading which enables the rollers to transmit a torque through frictional contact with the torus discs.

Lubricating oil fed into the gear through the passageway 114 and via one of the passageways 112 passes through a radial hole 146 (FIG. 4) in the sleeve 120 and thus enters an annular space 148 defined by the sleeve 120 and output shaft 6. From this annular space 148 lubricating oil flows through further radial holes 150 and 152 to the lubricating passageways 112 in the other arms of the main spider member. Lubricating oil from the secondary spider member passes from the left hand end of the annular space 148 through the radial holes 154 (FIG. 9) and through aligned holes 156 in the fixed hub sleeve 14 into a circumferential groove 158 in the hub sleeve 14, from where the lubricating oil can pass into the passages 112 in the secondary spider member.

By virtue of the fact that the same fluid is fed to the pressure cylinders and to the axial loading chamber 52, the axial loading force by which the torus discs are urged together will always be proportional to the pressure in the pressure cylinders.

As hereinbefore described, the idler gear wheel 46 drives a gear (not shown) on a shaft which drives a pump and a governor. The pump is that which provides the necessary control oil for for the pressure cylinders and axial loading chamber 52. The governor in one particular application of this gear may be used to maintain a constant output speed; for this purpose the governor would control the output pressure of the pump in response to the output speed, so as to decrease the pressure when the speed rises, and vice versa. A constant speed gear made in this manner is suitable for use in driving, for example, an aircraft alternator with power derived from the aircraft engine.

The reason for providing the pistons 86 with recesses 90 will now be explained. Because of the need to carry overloads, the control fluid pressure should be capable of being controlled and regulated at a value greater than and preferably at least twice the control pressure required for rated loads. However, when the variable ratio frictional drive gear is initially run up to speed the governor will signal an under speed and thus high pressure will be applied to the pressure cylinders and the axial loading chamber 52, and this will cause an unnecessary and detrimental application of high stresses to the gear. It is, therefore, advantageous to reduce the pressure of the control fluid when this condition arises and this is achieved by arranging that the recesses 90 formed in the pistons 86 permit control fluid to flow out of the pressure chambers 92 when this pressure increases to an unnecessary value. Thus, when the pistons reach a predetermined axial position, the recesses 90 will pass fluid which may conveniently return to sump and control of this fluid pressure will now, in effect, be transferred from the governor to these recesses. When such a position is reached that the recesses 90 pass fluid an increased torque on the gear will cause the roller carriages to move back and the pressure in the pressure cylinders will again rise to match the increase in load. The pistons 86 will thus adopt a relatively stable position until the gear has reached its normally operating speed whereupon the pistons 86 will return inwardly into the pressure cylinders 92 and the governor will take over the control of the gear.

Referring now more particularly to FIG. 12 of the accompanying drawings, there is shown therein an alternative embodiment wherein the piston means takes the form of a spool valve 160 but wherein the pistons 86 are still provided. One axial end of spool valve communicates with the outlet of the governor and the other axial end of the spool valve is connected by a coupling member 161 which has a part spherical end portion 163 located in a recess formed in said other axial end of the spool valve 160, to one of the pistons 86. The spool 162 of the spool valve 160 is provided with one annular groove 164 intermediate its axial ends and this groove together with the body of the valve 160 define an annular passage 166 which also communicates with the outlet of the governor. The body of the valve is also provided with an outlet 168 which is conveniently connected to sump and this outlet 168 is arranged such that the annular passage 166 will communicate with it when the spool 162 reaches a predetermined axial position relative to the body of the valve 160. Thus, in use, control fluid from the governor is fed towards said one axial end of the valve 160 and also into the annular passage 166. However, as long as the passage 166 does not communicate with the outlet 168 then the pressure applied to this passage will have no effect on the spool 162 since the pressures acting on surface 170 and 172 of the spool will balance out. Therefore, upon increase in control pressure the spool 162 will move towards the right (as shown in FIG. 12) and this will thus cause movement of the coupling member 161 which will in turn effect movement of said one of the pistons 86. When fluid pressure above that required is delivered by the pump via the governor in a manner hereinbefore described then the spool 162 will move to a position in which the passage 166 communicates with the outlet 168 and thus the pressure of control fluid applied to the spool 162 will be reduced which will in turn effect a reduction in the pressure which is applied to the coupling member 161. In this case said one of the pistons 86 will be mounted in a cylinder but this cylinder will not be supplied with pressurized hydraulic fluid. The other pistons 86 will however operate in a manner similar to that described in connection with the first embodiment except that the recesses 90 will not be provided and except that the hydraulic fluid supply to the associated cylinders will emanate from the supply to the spool valve 160. Thus, the pressure of the fluid supplied to said associated cylinders will be equl or substantially equal to that acting on said one axial end of the spool valve. Thus, this embodiment also provides means for reducing the pressure applied to the pistons 86 when the latter reach a predetermined axial position.

I claim:

1. A gear comprising at least two axially spaced torus discs between which there is a set of circumferentially spaced drive rollers in frictional rolling contact with toroidal surfaces on the discs, the rollers being rotatably mounted in respective tangentially controlled roller carriages having end portions lying on roller tilt axes at right angles to the axes of rotation of the respective rollers, the end portions of the roller carriages being slidably and rotatably supported by a support member whereby the roller carriages can be moved tangentially in order indirectly to control the ratio angle of the rollers, and piston means slidable in a cylinder to which fluid under pressure is applied in use, said piston means being connected to one end portion of at least one roller carriage to effect tangential movement of the roller carriage, means being also provided to reduce said fluid pressure, such means being operable to reduce said pressure when the piston reaches a predetermined axial position.

2. A gear as claimed in claim 1 wherein said means comprises at least one recess formed in said piston means so positioned that when said piston means reaches said predetermined axial position, fluid can escape from said cylinder through said recess.

3. A gear as claimed in claim 2 wherein end portions of the roller carriages are universally connected to respective individual piston means which are in the form of pistons slidable in respective cylinders arranged with their axes normal to the disc axis.

4. A gear as claimed in claim 2 wherein only one piston means having said recess is provided, said one piston means being connected to an end portion of one roller carriage to effect movement thereof, the remaining roller carriages each having end portions thereof connected to respective pistons slidable in cylinders under the influence of fluid emanating from a supply of such fluid to said one piston means.

5. A gear as claimed in claim 4 wherein said piston means is in the form of a spool valve having a recess in the form of an annular groove which defines, together with the body of the valve, an annular passage, the annular passage and one axial end of the spool valve being connected to a supply of fluid, the annular passage being arranged to communicate with an outlet in said valve body when the spool adopts a predetermined position relative to said valve body.

* * * * *